US012409104B2

(12) United States Patent
Ye et al.

(10) Patent No.: US 12,409,104 B2
(45) Date of Patent: Sep. 9, 2025

(54) DOUBLE-LAYER GLASS FEEDING BOTTLE WITH INTEGRALLY-FORMED BOTTOM

(71) Applicant: Zhejiang Aitu Trading Co., Ltd, Jinhua (CN)

(72) Inventors: Yangjun Ye, Jinhua (CN); Shuai Wang, Jinhua (CN)

(73) Assignee: Zhejiang Aitu Trading Co., Ltd, Jinhua (CN)

( * ) Notice: Subject to any disclaimer, the term of this patent is extended or adjusted under 35 U.S.C. 154(b) by 24 days.

(21) Appl. No.: 18/648,433

(22) Filed: Apr. 28, 2024

(65) Prior Publication Data

US 2024/0277579 A1 Aug. 22, 2024

(30) Foreign Application Priority Data

Dec. 29, 2023 (CN) ......................... 202323643353.7
Mar. 8, 2024 (CN) ......................... 202420448070.2

(51) Int. Cl.
*A61J 9/00* (2006.01)
*A61J 9/04* (2006.01)
*B65D 41/08* (2006.01)

(52) U.S. Cl.
CPC ............... *A61J 9/003* (2013.01); *A61J 9/001* (2013.01); *A61J 9/04* (2013.01); *B65D 41/08* (2013.01)

(58) Field of Classification Search
CPC ... A61J 9/003; A61J 9/001; A61J 9/04; B65D 1/40; B65D 25/18; B65D 25/14; B65D 41/086; B65D 41/08; B65D 41/04
USPC .................... 215/11.5, 11.4, 11.1, 12.1, 378; 220/62.15, 62.18, 62.12
See application file for complete search history.

(56) References Cited

U.S. PATENT DOCUMENTS 47,101 A * 4/1865 Haines ...................... C03B 9/02 65/153
1,694,754 A * 12/1928 Porter ...................... B65D 1/06 215/11.4
2,144,820 A * 1/1939 Thomas ................ A47J 41/022 220/592.27
3,516,567 A * 6/1970 Hemphill ............. B65D 81/266 206/204
4,125,640 A * 11/1978 Conant ............... C03C 17/3649 427/407.1
4,990,119 A * 2/1991 Amici ................ A63H 33/3022 446/188
6,123,065 A 9/2000 Teglbjarg
2003/0183596 A1* 10/2003 Lombardo ................ A61J 9/04 215/11.4
2019/0162979 A1* 5/2019 Staton .................... B65D 25/54

FOREIGN PATENT DOCUMENTS

CA 2215112 A1 * 3/1999 .............. A61J 9/001
WO WO-9421159 A1 * 9/1994 ............ A47J 41/024

* cited by examiner

*Primary Examiner* — Robert J Hicks

(57) ABSTRACT

A double-layer glass feeding bottle includes a bottle body, a first cap, a second cap, and a nipple. The first cap is threaded to an upper portion of a side wall of the bottle body. The nipple is fixedly connected to an inner side wall of the first cap. The second cap is provided at a top of the first cap. The bottle body includes an inner liner and an outer shell. The inner liner is provided inside the outer shell. A bottom of the outer shell is integrally formed with a bottom of the bottle body. A through hole is provided at the bottom of the outer shell. A one-way valve is provided inside the through hole.

8 Claims, 7 Drawing Sheets

DOUBLE-LAYER GLASS FEEDING BOTTLE WITH INTEGRALLY-FORMED BOTTOM

CROSS-REFERENCE TO RELATED APPLICATIONS

This application claims the benefit of priority from Chinese Patent Application No. 202323643353.7, filed on Dec. 29, 2023, and Chinese Patent Application No. 202420448070.2, filed on Mar. 8, 2024. The content of the aforementioned application, including any intervening amendments thereto, is incorporated herein by reference in its entirety.

TECHNICAL FIELD

This application relates to feeding bottles, and more particularly to a double-layer glass feeding bottle with an integrally-formed bottom.

BACKGROUND

Feeding bottles are designed for bottle feeding infants with milk. According to raw materials, the feeding bottles can be classified into glass feeding bottles and plastic feeding bottles, and the plastic feeding bottles are generally made of polycarbonate (PC), polypropylene (PP), polyether sulfone (PES), polyphenylsulphone (PPSU), and silicone.

A negative pressure will be created inside the bottle while the infant sucks on the teat of the existing feeding bottles, which will make it difficult for the infant to get the milk. Therefore, a double-layer glass feeding bottle with an integrally-formed bottom is provided to solve the above-mentioned problems in the prior art.

SUMMARY

In view of the deficiencies in the prior art, this application provides a double-layer glass feeding bottle with an integrally-formed bottom. The double-layer bottle structure can provide an improved thermal insulation effect. Moreover, a one-way valve is provided at a bottom end of an inner liner for air exchange, thereby effectively improving the feeding convenience.

Technical solutions of this application are described as follows.

This application provides a double-layer glass feeding bottle, comprising:

a bottle body;

a first cap;

a second cap; and a nipple;

wherein the first cap is threadedly connected to an upper portion of a side wall of the bottle body; the nipple is fixedly connected to an inner side wall of the first cap; the second cap is provided at a top of the first cap; the bottle body comprises an inner liner and an outer shell; the inner liner is provided inside the outer shell; a bottom of the inner liner is integrally formed with a bottom of the outer shell; a through hole is provided at the bottom of the outer shell; and a one-way valve is provided inside the through hole.

The bottom of the outer shell and the bottom of the inner liner are fixedly connected by firing, and the one-way valve is provided inside the bottom of the inner liner. The one-way valve is configured for air exchange when drinking milk, thereby avoiding negative pressure inside the bottle while sucking, and effectively improving the feeding convenience.

In an embodiment, a top end of the inner liner is integrally fused with an inner side wall of the outer shell; and the bottom of the inner liner in its entirety is fused with the bottom of the outer shell.

Such technical solution facilitates the discharge of gas.

In an embodiment, a top end of the inner liner is integrally fused with an inner side wall of the outer shell; and a middle of the bottom of the inner liner is integrally fused with a middle of the bottom of the outer shell.

In an embodiment, a vacuum closed chamber is formed between an inner side wall of the outer shell and the inner liner.

By means of the above technical solution, the feeding bottle is effectively insulated and has a good heat preservation effect.

In an embodiment, a limit ring is provided on a side wall of the one-way valve; and the one-way valve is fixed in the through hole through the limit ring.

By means of the above technical solution, the one-way valve is prevented from falling off during use.

In an embodiment, an anti-skid pattern is provided on a bottom end of the bottom of the outer shell.

By means of the above technical solution, the anti-skid pattern increases the friction of the bottle, thereby preventing the bottle from accidentally falling.

In an embodiment, the one-way valve is made of silicone material, and the through hole has a shape of round, square, or an irregular shape.

By means of the above technical solution, the air exchange operation is effectively carried out.

Further, the outer shell and inner liner are both made of a glass material.

By means of the above technical solution, the glass feeding bottle has high safety, heat resistance, not easy to scratch, high transparency, and is easy to clean and sterilize, relatively safe, and suitable for babies aged 0-6 months.

Compared to the prior art, this application has the following beneficial effects.

1. The feeding bottle is designed into a double-layer structure, and vacuuming is performed in the vacuum closed chamber between the outer shell and the inner liner, which effectively insulates the feeding bottle as a whole, so that the feeding bottle as a whole has a good heat preservation effect, and can also prevent the baby from being scalded by the bottle body while feeding, which effectively improves the safety of the feeding bottle.

2. The bottom of the outer shell and the bottom of the inner liner are fixedly connected by burning, and the bottom of the inner liner is provided with the one-way valve, through which the air exchange can be directly carried out while drinking milk, thereby avoiding negative pressure inside the bottle while sucking resulting in difficulties for drinking milk, and effectively improving feeding convenience.

3. The one-way valve is disposed at the bottom end of the inner side wall of the inner liner. When feeding the baby, the baby lies flat. As the baby sucks, the one-way valve is located above to directly exchange the air, thereby avoiding the baby inhaling air to prevent the baby flatulence. Moreover, the gas exchanged is not in direct contact with the milk, to effectively avoid that the milk is contaminated.

Figure 1:
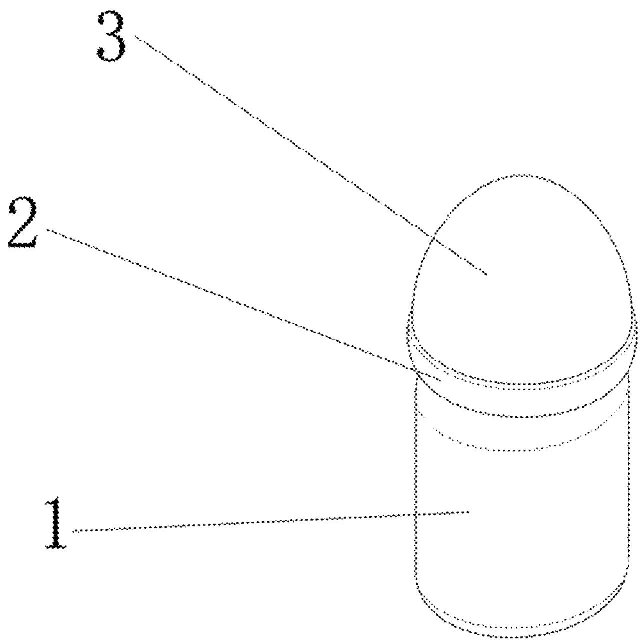
FIG. 1 is a perspective view of a double-layer glass feeding bottle according to Embodiment 1 of the present disclosure.
Figure 2:
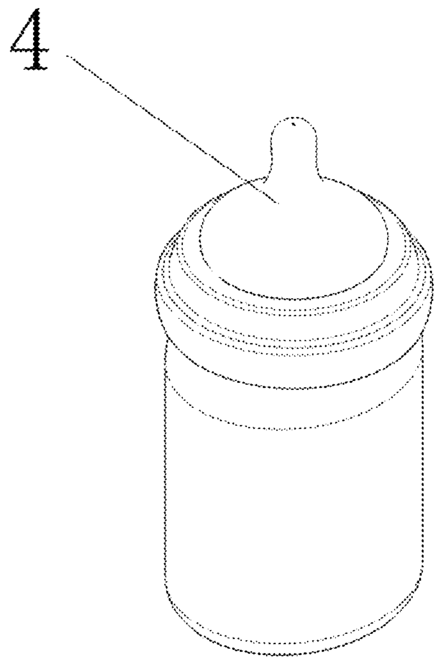
FIG. 2 is a perspective view of a bottle body according to an embodiment of the present disclosure.
Figure 3:
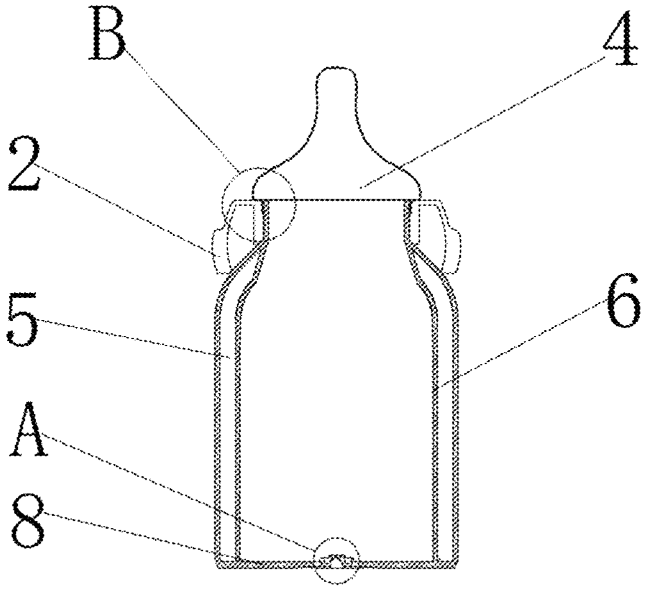
FIG. 3 is a sectional view of the double-layer glass feeding bottle according to an embodiment of the present disclosure.
Figure 4:
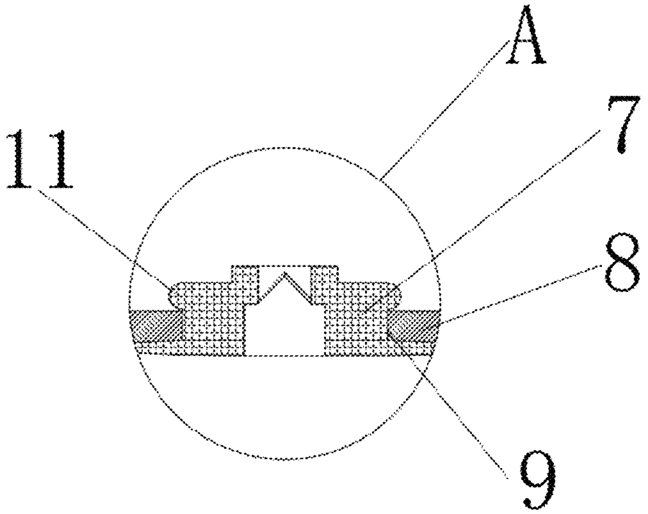
FIG. 4 is an enlarged view of portion "A" in FIG. 3.
Figure 5:
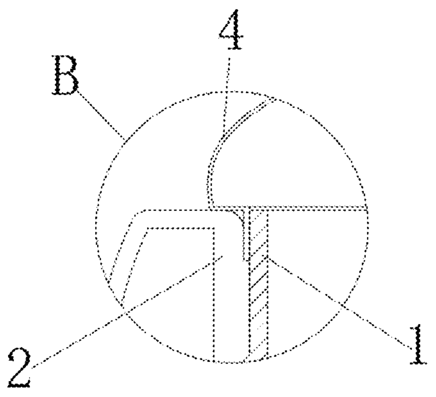
FIG. 5 is an enlarged view of portion "B" in FIG. 3.
Figure 6:
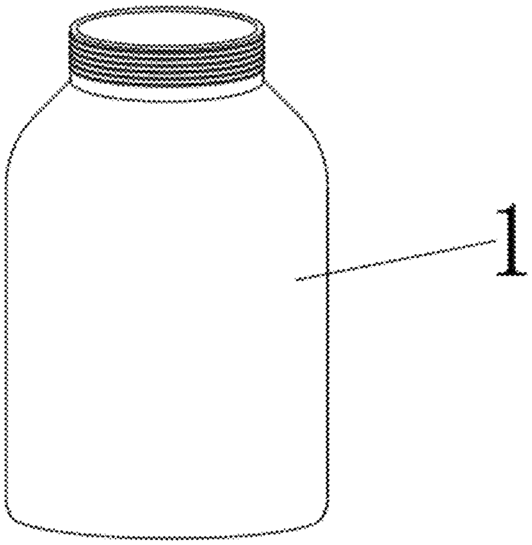
FIG. 6 is a schematic diagram of the bottle body according to an embodiment of the present disclosure.

1—bottle body; 2—first cap; 3—second cap; 4—nipple; 5—vacuum closed chamber; 6—inner liner; 7—one-way valve; 8—outer shell; 9—through hole; 10—inner liner bottom; and 11—limit ring.

DETAILED DESCRIPTION OF EMBODIMENTS

The technical solutions of the disclosure will be described in detail below in combination with the drawings in the embodiments to make the technical solutions, objects and advantages of the disclosure clearer. Obviously, described below are merely some embodiments of the disclosure, which are not intended to limit the disclosure. For those skilled in the art, other embodiments obtained based on these embodiments without paying creative efforts should fall within the scope of the disclosure defined by the appended claims.

Embodiment 1

Referring to FIGS. 1-6, a double-layer glass feeding bottle with an integrally-formed bottom includes a bottle body 1, a first cap 2, a second cap 3, and a nipple 4. The first cap 2 is threadedly connected to the upper portion of a side wall of the bottle body 1. The nipple 4 is fixedly connected to an inner side wall of the first cap 2. The second cap 3 is provided at the top of the first cap 2. The bottle body 1 includes an inner liner 6 and an outer shell 8. The inner liner 6 is provided inside the outer shell 8. The inner liner 6 is fixedly connected to the inner side wall of the bottom of the outer shell 8. The bottom of the inner liner 6 is integrally formed with the bottom of the outer shell 8. A through hole 9 is provided at the bottom of the outer shell 8. A one-way valve 7 is provided inside the through hole 9. A limit ring 11 is provided on a side wall of the one-way valve 7, and the one-way valve 7 is fixed in the through hole 9 through the limit ring 11. The feeding bottle is designed into a double-layer structure, and a vacuum closed chamber 5 is formed between the outer shell 8 and the inner liner 6, which can effectively improve heat preservation effect of the feeding bottle and prevent the baby from being scalded by the bottle body 1 when feeding, thereby effectively improving the safety of the bottle.

A top end of the inner liner 6 is integrally fused with an inner side wall of the outer shell 8. The bottom of the inner liner 6 is fused with the bottom of the outer shell 8. A vacuum closed chamber 5 is formed between the inner side wall of the outer shell 8 and the inner liner 6. An anti-skid pattern is provided on a bottom end of the bottom of the outer shell 8. The one-way valve 7 is made of silicone material. The through hole 9 has a shape of round, square, or an irregular shape, which is easy to process. The outer shell 8 and the inner liner 6 are both made of the glass material. The one-way valve 7 is provided inside the bottom end of the inner liner 6. The one-way valve 7 can directly perform air exchange while the baby drinking, thereby avoiding negative pressure inside the feeding bottle while sucking resulting in difficulties for drinking milk, and effectively improving feeding convenience. The one-way valve 7 is disposed at the bottom end of the inner side wall of the inner liner 6. When feeding the baby, the baby lies flat. As the baby sucks, the one-way valve 7 is located above to directly exchange the air with the outside, thereby avoiding the baby from inhaling to prevent the flatulence. Moreover, the replaced gas is not in direct contact with the milk, effectively preventing the milk from being contaminated.

Embodiment 2

Figure 7:
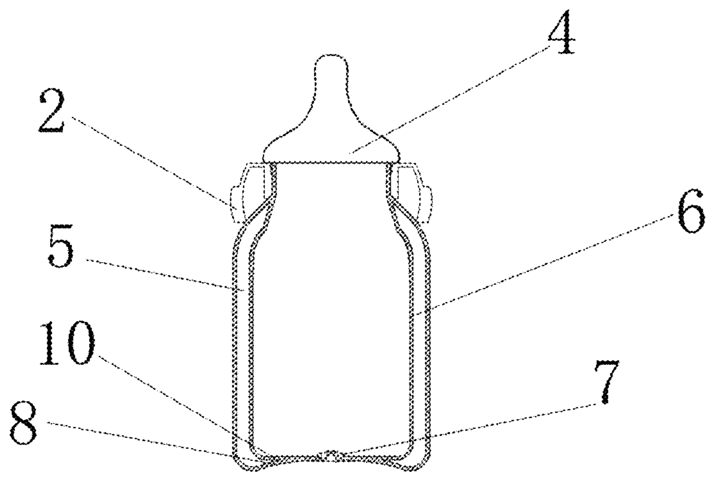
FIG. 7 is a sectional view of a double-layer glass feeding bottle according to Embodiment 2 of the present disclosure.

Referring to FIG. 7, the differences between Embodiment 2 and Embodiment 1 are that the inner liner bottom 10 is integrally molded on the body of the inner liner 6; and a middle of the bottom of the inner liner 6 and a middle of the bottom of the outer shell 8 are integrally fused.

The feeding bottle is designed into a double layer structure, and the vacuum closed chamber 5 is formed between the outer shell 8 and the inner liner 6, thereby allowing the feeding bottle to obtain good heat preservation effect and preventing the baby from being scalded by the bottle body 1 while feeding, which effectively improves the safety of the feeding bottle. The bottom of the outer shell 8 and the bottom of the inner liner 6 are fixedly connected by firing, and the one-way valve 7 is provided in the bottom of the outer shell 8. The one-way valve 7 can make the baby directly exchange air while drinking, thereby avoiding the formation of negative pressure inside the feeding bottle while sucking, and effectively improving feeding convenience. The one-way valve 7 is disposed at the bottom of the outer shell 8. When feeding the baby, the baby lies flat. As the baby sucks, the one-way valve 7 is located above to directly exchange the air, thereby avoiding the baby inhaling air to prevent the baby flatulence. Moreover, the exchanged gas is not in direct contact with the milk, thereby effectively avoiding that the milk is contaminated.

In some embodiments, the inner liner bottom 10 is designed to be flat, and the bottom of the outer shell 8 is designed to be concave.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. A double-layer glass feeding bottle, comprising:

a bottle body;

a first cap;

a second cap; and a nipple;

wherein the first cap is threadedly connected to an upper portion of a side wall of the bottle body; the nipple is fixedly connected to an inner side wall of the first cap; the second cap is provided at a top of the first cap; the bottle body comprises an inner liner and an outer shell; the inner liner is provided inside the outer shell; a bottom of the inner liner is integrally formed with a bottom of the outer shell; a through hole is provided at the bottom of the outer shell; and a one-way valve is provided inside the through hole.

2. The double-layer glass feeding bottle of claim 1, wherein a top end of the inner liner is integrally fused with an inner side wall of the outer shell; and the bottom of the inner liner in its entirety is fused with the bottom of the outer shell.

3. The double-layer glass feeding bottle of claim 1, wherein a top end of the inner liner is integrally fused with an inner side wall of the outer shell; and a middle of the bottom of the inner liner is integrally fused with a middle of the bottom of the outer shell.

4. The double-layer glass feeding bottle of claim 1, wherein a vacuum closed chamber is formed between an inner side wall of the outer shell and the inner liner.

5. The double-layer glass feeding bottle of claim 1, wherein an anti-skid pattern is provided on a bottom end of the bottom of the outer shell.

6. The double-layer glass feeding bottle of claim 1, wherein a limit ring is provided on a side wall of the one-way valve; and the one-way valve is fixed in the through hole through the limit ring.

7. The double-layer glass feeding bottle of claim 1, wherein the one-way valve is made of silicone; and the through hole has a shape of round, square, or an irregular shape.

8. The double-layer glass feeding bottle of claim 1, wherein the outer shell and the inner liner are both made of a glass material.

* * * * *